(12) United States Patent
Lu et al.

(10) Patent No.: US 12,411,720 B2
(45) Date of Patent: *Sep. 9, 2025

(54) CROSS-CLUSTER LOAD BALANCER

(71) Applicant: VMware LLC, Palo Alto, CA (US)

(72) Inventors: Lei Lu, Campbell, CA (US); Varun S Lingaraju, San Jose, CA (US); Zhelong Pan, Cupertino, CA (US); Rajesh Venkatasubramanian, San Jose, CA (US); Sahan Bamunavita Gamage, San Jose, CA (US); Charan Krishna Singh, Sunnyvale, CA (US); Bing Hu, Sunnyvale, CA (US); Xiaoyuan Lu, Campbell, CA (US)

(73) Assignee: VMware LLC, Palo Alto, CA (US)

( * ) Notice: Subject to any disclaimer, the term of this patent is extended or adjusted under 35 U.S.C. 154(b) by 225 days.

This patent is subject to a terminal disclaimer.

(21) Appl. No.: 18/363,656

(22) Filed: Aug. 1, 2023

(65) Prior Publication Data

US 2023/0376359 A1 Nov. 23, 2023

Related U.S. Application Data

(63) Continuation of application No. 16/887,932, filed on May 29, 2020, now Pat. No. 11,755,385.

(51) Int. Cl.
*G06F 9/50* (2006.01)
*G06F 9/48* (2006.01)
*G06F 9/54* (2006.01)

(52) U.S. Cl.
CPC .......... *G06F 9/5088* (2013.01); *G06F 9/4875* (2013.01); *G06F 9/5077* (2013.01); *G06F 9/547* (2013.01); *G06F 2209/505* (2013.01)

(58) Field of Classification Search
CPC .... G06F 9/5088; G06F 9/4875; G06F 9/5077; G06F 9/547; G06F 2209/505; G06F 2209/501; G06F 9/4856
See application file for complete search history.

(56) References Cited

U.S. PATENT DOCUMENTS

| | | |
|---|---|---|
| 8,095,929 B1 | 1/2012 | Ji et al. |
| 9,363,192 B2 | 6/2016 | Padala et al. |
| 10,430,248 B2 | 10/2019 | Wiggers et al. |
| 10,853,128 B2 | 12/2020 | Sato et al. |
| 10,965,752 B1 | 3/2021 | Smith |
| 2007/0294562 A1 | 12/2007 | Takamatsu et al. |
| 2014/0173593 A1 | 6/2014 | Padala et al. |

(Continued)

FOREIGN PATENT DOCUMENTS

| | | |
|---|---|---|
| CN | 102170440 A | 8/2011 |
| CN | 105700945 A | 6/2016 |

(Continued)

*Primary Examiner* — Aimee Li
*Assistant Examiner* — Hsing Chun Lin
(74) *Attorney, Agent, or Firm* — King Intellectual Asset Management

(57) ABSTRACT

Various examples are disclosed for performing cross-cluster load balancing. In some aspects, a workload is selected for cross-cluster migration. A destination cluster is identified for a migration of the workload from a source cluster to the destination cluster. A cross-cluster migration recommendation is generated to migrate the workload from the source cluster to the destination cluster.

20 Claims, 4 Drawing Sheets

(56) References Cited

U.S. PATENT DOCUMENTS

2017/0116626 A1* 4/2017 Ramamoorthy ........ H04L 41/40
2020/0225970 A1   7/2020 Mohanta et al.

FOREIGN PATENT DOCUMENTS

| CN | 108009002 A | 5/2018 |
| CN | 110673927 A | 1/2020 |
| CN | 110737507 A | 1/2020 |

* cited by examiner

CROSS-CLUSTER LOAD BALANCER

CROSS-REFERENCE TO RELATED APPLICATIONS

This is a continuation application that claims priority to and the benefit of U.S. Non-provisional patent application Ser. No. 16/887,932, entitled "CROSS-CLUSTER LOAD BALANCES" and filed on May 29, 2020, which is incorporated by reference as if set forth herein in its entirety.

BACKGROUND

Computer virtualization relates to the creation of a virtualized version of a physical device, such as a server, a storage device, a central processing unit (CPU), a graphics processing unit (GPU), or other computing resources. Virtual machines, containers, and other workloads can perform enterprise tasks such as providing virtual desktop services, machine learning services, web services, and other services. The virtual machines can be executed using physical hardware in a datacenter. The datacenter can include many physical resources arranged in a cluster or group of hosts.

Resource schedulers can determine the optimal placement of virtual machines and other workloads within a cluster. A resource scheduler can dynamically monitor a cluster and allocate physical resources to virtual machines within the cluster. The resource scheduler can also redistribute the virtual machines for load balancing purposes within the cluster. As datacenters expand, multi-cluster configurations are becoming more common. Single cluster private cloud configurations can be expanded to include public cloud resources to create a hybrid cloud environment.

Resource management in a complex cloud environment with multiple clusters is a hard problem in view of scalability requirements, the heterogeneity of resource types, and the variability of workloads. Cluster-based limitations of existing solutions can result in a failure to effectively manage multi-cluster datacenter configurations.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to cross-cluster load balancing. Resource schedulers can dynamically monitor datacenter clusters, allocating and redistributing workloads to the physical resources. As datacenters expand, multi-cluster configurations are becoming more common. Private cloud configurations can be expanded to include public cloud resources, creating a hybrid cloud environment. Existing technologies can fail to effectively manage multi-cluster datacenter configurations. However, the present disclosure describes mechanisms that can more efficiently and effectively manage workloads across multi-cluster datacenters.

Figure 1:
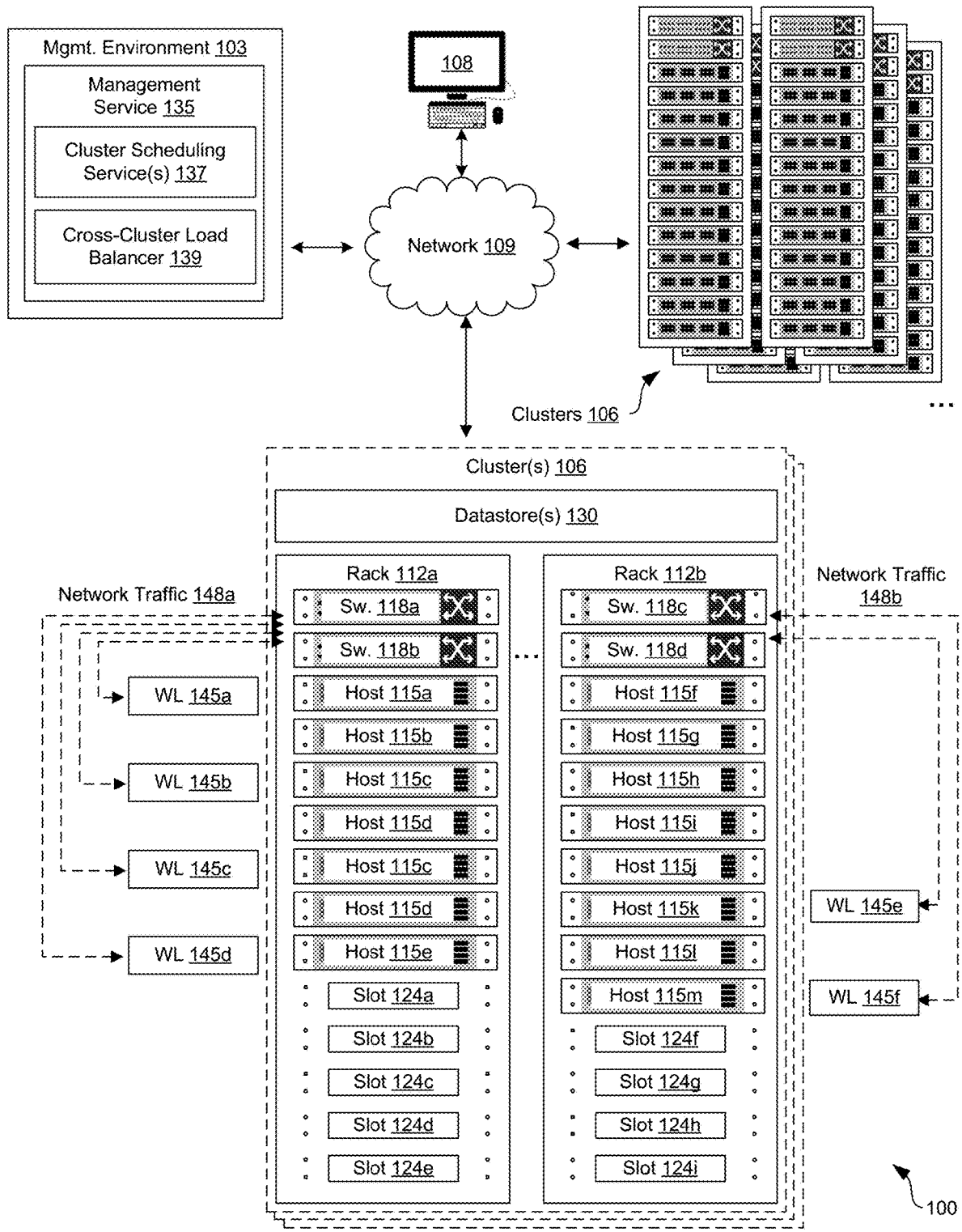
FIG. 1 is a drawing of an example of a networked environment that includes a number of compute clusters that are managed using a management service that includes a cross-cluster load balancer.

With reference to FIG. 1, an example of a networked environment 100 is shown. The networked environment 100 can include a management environment 103 and various clusters 106 in communication with one another over a network 109. The network 109 can include, for example, the Internet, intranets, extranets, wide area networks (WANs), local area networks (LANs), wired networks, wireless networks, other suitable networks, or any combination of two or more such networks. For example, the networks can include satellite networks, cable networks, Ethernet networks, telephony networks, and other types of networks. As the networked environment 100 can serve up virtual desktops to end users, the networked environment 100 can also be described as a virtual desktop infrastructure (VDI) environment.

In various embodiments, each of the clusters 106 can include a plurality of physical devices including the hosts 115a ... 115m (the hosts 115), installed in racks 112a and 112b (the racks 112) which can make up a server bank, aggregate computing system, or a computer bank of a datacenter. The cluster 106 can include a set of hosts 115 and other hardware resources that are managed as a group by a cluster scheduling service 137 that operates at a cluster level to balance workloads 145 within a single cluster 106. The various physical devices or hosts 115 of a cluster 106 can be located in a single facility or can be located in a separate geographical location. Multiple clusters 106 can be located in a single facility, and additional clusters 106 can be located in a separate geographical location. The devices in the clusters 106 can include any number of physical machines, virtual machines, virtual appliances, and software, such as operating systems, drivers, hypervisors, scripts, and applications. The various clusters 106 can include private cloud, public cloud, and hybrid cloud configurations.

In various examples, when a physical computing device or host 115 is added to a cluster 106, the host 115 can be configured to access a datastore 130 corresponding to that cluster 106. In other words, in order to access a datastore 130, a host 115 must be a member of the corresponding cluster 106. In some cases, the cluster 106 can include a virtual storage area network (vSAN) cluster in a VMware vSphere® or similar environment. A vSAN cluster 106 can aggregate capacity devices of the vSAN cluster 106 to create a single storage pool shared across all hosts 115 in the vSAN cluster 106. For example, the datastore 130 can include a vSAN datastore 130 that aggregates the storage available to all of the physical resources and hosts 115 that are assigned to the cluster 106.

The datastore 130 can include storage area network, network file system, virtual machine file system, and hyperconverged infrastructure storage. In some examples the datastore 130 can be cluster-specific so that the datastore 130 is dedicated to a single cluster 106 that has direct access to that cluster-level datastore 130. The datastore 130 can be accessible to all hosts 115 of a particular cluster 106. Alternatively, the datastore 130 can be accessible to the hosts 115 of multiple clusters 106.

A hypervisor can be installed on a host 115 to support workload execution space within which one or more virtual machines can be concurrently instantiated and executed. In some examples, the hypervisor can include the VMware ESX™ hypervisor, the VMware ESXi™ hypervisor, or similar hypervisor. The cluster scheduling services 137 can manage virtual machines, containers, and other workloads 145a . . . 145f (workloads 145) to the hosts 115 at a cluster level. A respective cluster scheduling service 137 can manage a particular cluster 106. The cluster scheduling service 137 can monitor, assign, and redistribute workloads 145 among the hosts 115 in its cluster 106. For example, a cluster scheduling service 137 can manage workloads 145 among the hosts 115 that are assigned to a particular cluster 106 or a datastore 130.

Additionally, if a host 115 includes an instance of a virtual machine, container, or another workload, the workload can be referred to as a "guest." It is understood that the clusters 106 are scalable, meaning that the clusters 106 in the networked environment 100 can be dynamically scaled up and scaled down to include additional and fewer hosts 115, switches 118, accelerators, power sources, and other components, without degrading performance of the virtualization environment. For example, the cluster scheduling service 137 can include an automatic scaling functionality that dynamically scales up and scales down a particular cluster 106.

The management service 135 can also include a cross-cluster load balancer 139 capable of cross-cluster migration of workloads 145 from one cluster 106 to another. The cross-cluster load balancer 139 can operate at a datacenter level for all clusters 106 and can perform cross-cluster migrations for load balancing, cost saving, and other purposes. The migration can include no downtime or minimal downtime of the workloads 145 during migration. For example, the workload 145 can be copied from a source host 115, and replicated to a destination host 115. Once the workload 145 is executing on the destination host 115, the workload 145 can be halted and removed from the source host 115. Unlike traditional technologies that might extend a cluster 106 or a datastore 130 across multiple sites, and rely on a cluster scheduling service 137 for load balancing, the cross-cluster load balancer 139 is capable of load balancing by workload migration across multiple clusters 106.

The cross-cluster load balancer 139 can provide a number of internal application programming interfaces (APIs), including a recommendation API, a migration API, and a stop or cancel API. The recommendation API can be invoked with input parameters including a set of participant clusters 106 to analyze for cross-cluster load balancing, and a mode selection between manual or automated modes. The participant set of clusters 106 can include all clusters 106 of an enterprise datacenter, or a manually-selected subset of the clusters 106.

In manual mode, the cross-cluster load balancer 139 can generate and provide migration recommendations for manual acceptance. The migration API can be invoked if the management service 135 identifies a manual indication to implement the migration recommendations. The cancel API can be invoked to manually stop a cross-cluster migration that is being performed. The cancel API can also clean up or delete partially-deployed workloads 145 from the prospective destination. In automated mode, the cross-cluster load balancer 139 can generate migration recommendations and perform migrations based on the recommendations.

A decision made by the cluster scheduling service 137 to scale up or scale down a cluster 106 can conflict with the cross-cluster migration decisions of the cross-cluster load balancer 139. Likewise, a decision made by the cross-cluster load balancer 139 to scale workloads 145 of a cluster 106 by cross-cluster migration can conflict with the automatic host scaling functionality of the cluster scheduling service 137. For example, if cluster resources are overloaded, the cluster scheduling service 137 can decide to add a host 115 to a cluster 106, while the cross-cluster load balancer 139 can decide to move out several workloads 145 from the cluster. To avoid a potential conflict, the management service 135 provides a mutual exclusion control rule over a cluster 106 between the cross-cluster load balancer 139 and the cluster scheduling service 137. While both the cross-cluster load balancer 139 and the cluster scheduling service 137 can be concurrently enabled for a single cluster 106, the mutual exclusion control rule can indicate that when the cross-cluster load balancer 139 (or the cluster scheduling service 137) works on a cluster 106, the cluster scheduling service 137 (or the cross-cluster load balancer 139) is temporarily prevented from making scaling decisions.

In one example, if the cross-cluster load balancer 139 migrates a workload 145 from one cluster 106 to another cluster 106, this can increase resource usage of the destination cluster. However, the mutual exclusion control rule can prevent the cluster scheduling service 137 of the destination cluster 106 from scaling up or adding a host 115 to the destination cluster for a period of time. The cluster scheduling service 137 of the source cluster 106 can also be prevented from scaling down or removing a host 115 for a period of time.

The cross-cluster load balancer 139 can provide an indication that it is generating recommendations for cross-cluster migrations or has generated recommendations for cross-cluster migrations, and the cluster scheduling service 137 can be temporarily prevented from making scaling decisions. The cluster scheduling service 137 can be prevented from making scaling decisions in response to various events associated with the cross-cluster load balancer 139 working on a cluster 106, including generating recommendations, providing a cross-cluster migration recommendation, or completion of a cross-cluster migration according to the mutual exclusion control rule. The cross-cluster load balancer 139 can be prevented from generating, providing, and performing cross-cluster migrations in response to various events associated with the cluster scheduling service 137 working on a cluster 106, including generating, providing, and performing host scaling recommendations.

The hosts 115 in the cluster 106 are monitored by the management service 135 and, in the event of a failure, the virtual machines, virtual appliances, or workloads 145 on a failed host 115 are restarted on alternate hosts 115. In some examples, the cluster 106 can include a high-availability cluster or other computing cluster. A high-availability cluster can include a group of computing devices that act as a single system and provide a continuous uptime. Some of the hosts in the cluster 106 can be designated as primary hosts 115, and other hosts in the cluster 106 can be designated as secondary hosts. The primary hosts 115, for example, can maintain and replicate states of the cluster 106 and can be used to initiate failover actions. Any host 115 that joins the cluster 106 can communicate with a host 115, such as an existing primary host 115, to complete its configuration.

The devices in the racks 112 can include, for example, memory and storage devices, hosts 115a . . . 115m, switches 118a . . . 118d, graphics cards with GPUs, artificial intelligence and other accelerators, central processing units (CPUs), power supplies, and similar devices. The devices, such as hosts 115 and switches 118, can have dimensions suitable for quick installation in slots 124a . . . 124i on the racks 112. In various examples, the hosts 115 can include requisite physical hardware and software to create and manage a virtualization infrastructure. The physical hardware resources for a host 115 can include a CPU, data bus, memory, graphics card/accelerator, artificial intelligence accelerator, other accelerators, and other components. The host memories can include short-term access memories including random access memory (RAM), dynamic RAM (DRAM), and synchronous DRAM (SDRAM); and long term data storage including solid state drives (SSDs), and hard disk drives (HDDs). In some examples, the hosts 115 can include a pre-configured hyper-converged computing device where a hyper-converged computing device includes pre-tested, pre-configured, and pre-integrated storage, server and network components, including software, that are positioned in an enclosure installed in a slot 124 on a rack 112.

The management environment 103 can include, for example, a server or any other system providing computing capability. Alternatively, the management environment 103 can include one or more computing devices that are arranged, for example, in one or more server banks, computer banks, clusters, or other arrangements. The management environment 103 can include a grid computing resource or any other distributed computing arrangement. The computing devices can be located in a single installation or can be distributed among many different geographical locations. Although shown separately from the clusters 106, it is understood that in some examples the management environment 103 can include the clusters 106.

The management environment 103 can include or be operated as one or more virtualized computer instances. For purposes of convenience, the management environment 103 is referred to herein in the singular. Even though the management environment 103 is referred to in the singular, it is understood that a plurality of management environments 103 can be employed in the various arrangements as described above. As the management environment 103 communicates with the clusters 106 and client devices 108 for end users over the network 109, sometimes remotely, the management environment 103 can be described as a remote management environment 103, in some examples. Additionally, in some examples, the management environment 103 can be implemented in hosts 115 of a rack 112 and can manage operations of a virtualized computing environment. Hence, in some examples, the management environment 103 can be referred to as a management cluster in the clusters 106.

The datastore 130 can include a database or other memory that includes, for example, virtual appliance images, virtual machine images, other workload images and other data associated with the various workloads 145. A workload image can include virtual machine images utilized by the components of the management service 135 in provisioning, executing, and migrating a workload 145 ready to run on a hypervisor of a host 115 in the cluster 106.

The components executed in the management environment 103 can include, for example, a cluster management service 135 as well as other applications, services, processes, systems, engines, or functionality not discussed in detail herein. The cluster management service 135 can be executed to oversee the operation of the networked environment 100 through management of the clusters 106, as well as the devices and software that make up the clusters 106, such as virtual machines and virtual appliances. In some examples, an enterprise, organization, or other entity, can operate the cluster management service 135 to oversee or manage the operation of devices in the racks 112, such as hosts 115, switches 118, accelerators, power supplies, cooling systems, and other components.

As discussed above, the cluster management service 135 can include a number of cluster scheduling services 137 that operate at a cluster level, as well as a cross-cluster load balancer 139 that operates across all clusters 106 of the datacenter. The various physical and virtual components of the clusters 106 can process workloads 145a . . . 145f. Workloads 145 can refer to the amount of processing that a host 115, switch 118, accelerator, or other physical or virtual component has been instructed to process or route at a given time. The workloads 145 can be associated with virtual machines or other software executing on the hosts 115. The cluster management service 135 can maintain a listing of active or inactive workloads 145 as well as oversee the assignment of various workloads 145 to various devices in the clusters 106. The workloads 145 can be routed to various hosts 115 by the switches 118 as network traffic 148a . . . 148b.

Figure 2:
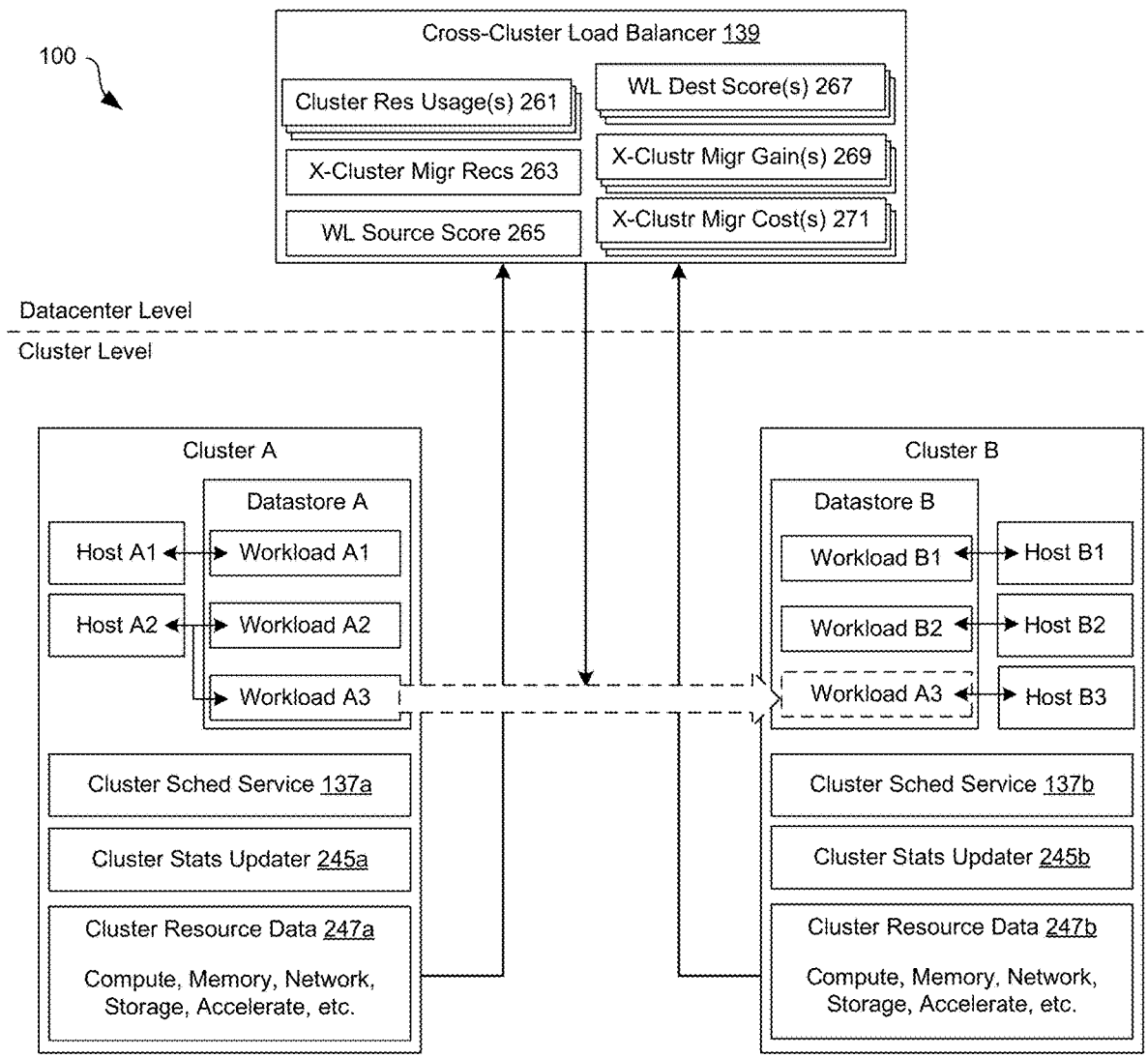
FIG. 2 is a drawing that illustrates an example of functionality implemented by the cross-cluster load balancer and other components of the networked environment of FIG. 1.

Referring next to FIG. 2, shown is an example of the functionality implemented by the cross-cluster load balancer 139 and other components of the networked environment 100 of FIG. 1. In this example, the networked environment 100 can include the cross-cluster load balancer 139 operating at a datacenter level to control cluster A and cluster B. Clusters A and B are used for clarity purposes to refer to various clusters 106.

Cluster A can include hosts A1 and A2, as well as a datastore A. Cluster B can include hosts B1 and B2, as well as a datastore B. The hosts A1, A2, B1, and B2 are used for clarity purposes to refer to various hosts 115. The cluster-level datastores A and B are used for clarity purposes to refer to various cluster-level datastores 130. The datastore A can include workloads A1, A2, and A3. The datastore B can include workloads B1 and B2. The workloads A1, A2, A3, B1, and B2 are used for clarity purposes to refer to various workloads 145.

In cluster A, host A1 can execute workload A1; host A2 can execute workload A2 as well as workload A3. The cluster scheduling service 137a can manage intra-cluster load balancing and migrations for the workloads A1, A2, A3 among the hosts A1 and A2, as well as host scaling to include additional or fewer hosts within cluster A. Cluster statistics updater 245a can collect and monitor cluster resource data 247a for cluster A. In some cases, the cluster statistics updater 245a can identify cluster resource data 247a that is collected by the cluster scheduling service 137a, and provide this cluster resource data 247a to the cross-cluster load balancer 139. The cluster resource data 247a can include compute, memory, storage, network, accelerate, and other hardware resource information for cluster A.

In cluster B, host B1 can execute workload B1; and host B2 can execute workload B2. The cluster scheduling service 137b can manage intra-cluster load balancing and migrations for the workloads B1 and B2 among the hosts B1, B2, and B3, as well as host scaling to include additional or fewer hosts within cluster B. Cluster statistics updater 245b can collect and monitor cluster resource data 247b for cluster B. In some cases, the cluster statistics updater 245b can monitor cluster resource data 247b that is collected by the cluster scheduling service 137b, and can provide this cluster resource data 247b to the cross-cluster load balancer 139. The cluster resource data 247b can include compute, memory, storage, network, accelerate, and other hardware resource information for cluster B.

Compute resource information can include a measure of compute capacity provided, used, and percentage utilized. Compute capacity can be measured as a number of processors of a particular type, or a frequency of operations such as megahertz, gigahertz, or terahertz. Memory resource information can include a measure of temporary or access memory capacity provided, used, and percentage utilized. Memory capacity can be measured as a number of megabytes, gigabytes, or terabytes. Storage resource information can include a measure of data storage capacity provided, used, and percentage utilized. Data storage capacity can be measured as a number of megabytes, gigabytes, or terabytes. Network resource information can include a measure of network communication capacity provided, used, and percentage utilized. Network communication capacity can be measured as a number of inputs/outputs (IOs), or a network bandwidth. Accelerate resource information can include a measure of accelerator-type-specific compute capacity provided, used, and percentage utilized for each hardware accelerator type. Accelerator types can include graphics processing accelerators, artificial intelligence accelerators, and other hardware accelerators. Accelerate capacity can be measured as a number of accelerators or accelerator processors of a particular type, or a frequency of operations such as megahertz, gigahertz, or terahertz. Percentage utilized for each hardware resource can refer to a current instantaneous reading or a calculated time-average.

The cross-cluster load balancer 139 can monitor the cluster resource data 247a and 247b to determine whether to perform one or more cross-cluster migrations for load balancing. The cross-cluster load balancer 139 can generate cluster resource usages 261 for each of the clusters A and B, as well as other clusters 106. The cluster resource usage 261 can include a cluster resource usage score that considers one or more of the compute, memory, storage, network, accelerate, and other hardware resource information for each cluster. The cluster resource usage 261 can refer to cluster-level resource usage.

The cluster resource usage 261 can be based on percent resource usage or resource contention. Percent resource usage can refer to the percentage of the total resources that are utilized. Resource contention can refer to the amount of expected performance loss due to the contention for a resource as a percentage. For example, if the memory resource contention for the cluster is 80%, memory contention can cause 80% percent loss in overall cluster throughput across all workloads. Resource contention can be related to efficiency so that a resource contention of 80% corresponds to an efficiency of 20%. The cluster resource usage 261 can also be determined using a weighted average or other weighted cluster resource usage score can be calculated, with each resource being weighted with a predetermined coefficient.

In some cases, the cluster resource usage 261 can refer to a dominant resource usage for each cluster. A dominant resource usage can refer to the hardware resource with the highest percent resource usage or resource contention. For example, if cluster A uses 50% of its storage capacity, 75% of its network capacity, and 90% of its compute capacity, its dominant resource usage can be based on compute capacity, and the cluster usage score can be based on the 90% compute capacity usage. If cluster B uses A uses 60% of its storage capacity, 35% of its network capacity, and 50% of its compute capacity, its dominant resource usage can be based on storage capacity, and the cluster usage score can be based on the 60% storage capacity usage. When sorting, the cross-cluster load balancer 139 can identify that 90% dominant resource usage for cluster A is greater than the 60% dominant resource usage for cluster B.

The cross-cluster load balancer 139 can sort the clusters in a ranked list in descending order according to their cluster resource usage 261. The cross-cluster load balancer 139 can select the highest cluster from the ranked list as a source cluster to analyze. In this case, cluster A can be the source cluster. The cross-cluster load balancer 139 can analyze each of the workloads of cluster A to generate cross-cluster migration recommendations 263. In this example, the cross-cluster load balancer 139 can recommend a cross-cluster migration of the workload A3 to cluster B. The cross-cluster load balancer 139 can select the cluster B as a destination cluster based on the cluster resource usage 261 for cluster B. For example, the destination cluster B can have a lower cluster resource usage 261 than the source cluster A. In some cases, the destination cluster B can be selected based on having a lowest cluster resource usage 261 among the clusters 106 of a datacenter.

The cross-cluster migration recommendation 263 can specify cluster B corresponding to datastore B, and can further specify the optimal host as host B3. In other examples, the cross-cluster migration recommendation 263 can specify a migration to cluster B, and the cluster scheduling service 137b can select a host 115 for the workload A3. The cross-cluster load balancer 139 or the management service 135 can generate a user interface that presents the cross-cluster migration recommendations 263 for manual approval. The cross-cluster load balancer 139 can also use the cross-cluster migration recommendations 263 to automatically migrate workloads 145.

The cross-cluster load balancer 139 can generate a workload source score 265 for the workload A3 based on its source cluster A, source datastore A, and host A2. In one example, the workload source score 265, scores, can be calculated based on a hardware resource efficiency of the workload A3 executed on cluster A. The workload source score 265 can be based on the efficiency of host-specific resource usage and/or cluster-level resource usage for the source of workload A3. In other words, the workload source score 265 can refer to a source hardware resource efficiency associated with the workload A3. The workload source score 265 can be calculated based on equation 1, where eff(cpu$_s$) can refer to source CPU efficiency, eff(mem$_s$) can refer to source short term or access memory efficiency, eff(net$_s$) can refer to source network efficiency, and eff(storage$_s$) can refer to source storage efficiency.

$$\text{score}_s = \text{eff}(\text{cpu}_s) \times \text{eff}(\text{mem}_s) \times \text{eff}(\text{net}_s) \times \text{eff}(\text{storage}_s) \quad (1)$$

Efficiency can represent the amount of expected performance loss due to the contention for a resource, assuming all other resources are in perfect state, and the unit of the efficiency is percent. For example, if the memory efficiency is 80%, memory contention can cause 20% loss in overall workload or virtual machine throughput. In the example of equation 1, the overall workload source score 265, score$_s$, can be a product of the efficiencies of the resources considered. Other measures, such as weighted products or weighted averages can also be used, where each resource is weighted according to a predetermined coefficient based on subjective or objective performance criteria.

The cross-cluster load balancer 139 can generate workload destination scores 267 or candidate destination scores for the workload A3 based on candidate destination cluster B. A workload destination score 267 can be based on efficiency of cluster-level resource usage for the candidate destination cluster B for workload A3, or the efficiency of host-specific resource usage if the workload A3 was assigned to a particular candidate host among the hosts B1, B2, and B3. The workload destination score 267 can be based on the efficiency of host-specific resource usage and/or cluster-level resource usage for the candidate destination for workload A3. In other words, the workload destination score 267 can refer to a destination hardware resource efficiency associated with the workload A3. The workload destination score 267, $score_d$, can be calculated based on equation 2.

$$score_d = \text{eff}(cpu_d) \times \text{eff}(mem_d) \times \text{eff}(net_d) \times \text{eff}(storage_d) \quad (2)$$

In equation 2, $\text{eff}(cpu_d)$ can refer to candidate destination CPU efficiency, $\text{eff}(mem_d)$ can refer to destination short term or access memory efficiency, $\text{eff}(net_d)$ can refer to destination network efficiency, and $\text{eff}(storage_d)$ can refer to destination storage efficiency.

The cross-cluster load balancer 139 can further determine whether to make a cross-cluster migration recommendation 263 based on cross-cluster migration gains 269. The cross-cluster migration gain 269 can refer to the hardware resource efficiency benefit of moving the workload A3 from its source cluster, datastore, and host to a destination cluster, datastore, and host. The cross-cluster migration gain 269 can be determined based on a gain rate and a gain duration for a cross-cluster migration. The gain rate and gain duration can be determined based on host-specific resource measures or cluster-level resource measures. For example, the gain rate can be calculated according to equation 3 based on CPU demand or estimated requirement for the workload A3.

$$\text{gainrate} = cpuDemand \times (score_d - score_s) \quad (3)$$

While equation 3 uses the CPU demand, another hardware requirement can also be utilized alternatively or additionally to the CPU demand.

The gain duration can refer to how long the gain rate is predicted or estimated to last on the destination side. We estimate the gain duration based on the workload in/out migration behavior on each host 115 and the cross-cluster migration time. The in/out migration behavior can be based on cross-cluster migrations, but can also consider intra-cluster migrations. If a host 115 has more frequent in/out actions, the gain duration value is reduced. The estimated cross-cluster migration time is also taken out of the gain duration since there is no performance gain during migration.

The cross-cluster load balancer 139 can determine the cross-cluster migration gain 269 as the product of a gain rate and a gain duration. The cross-cluster load balancer 139 can compare the cross-cluster migration gain 269 to an estimated or predetermined cross-cluster migration cost 271, as shown in equation 4.

$$\text{gainrate} \times \text{gainDuration} > x\text{ClusterMigrationCost} \quad (4)$$

The cross-cluster migration cost 271 can be determined based on measured values in live or simulated environments. If the product of the gain rate and the gain duration is greater than the cross-cluster migration cost 271, then the cross-cluster load balancer 139 can make or provide a cross-cluster migration recommendation 263 that specifies a cross-cluster migration of the workload A3 to the cluster B and/or the host B3. In an automated mode, the cross-cluster load balancer 139 can automatically perform the migration. In a manual mode, the cross-cluster load balancer 139 can present the cluster migration recommendation 163 for manual acceptance or rejection through a console user interface of the management service 135.

The cross-cluster load balancer 139 can consider workload-to-workload affinity rules, including affinities and anti-affinities. And affinity rule can specify that workloads should be (or should not be) executed on the same host or same cluster. If the workload A3 has an affinity with the workload A2, the cross-cluster load balancer 139 can consider the two workloads and migrate the workloads A2 and A3 to cluster B if both workloads A2 and A3 have cross-cluster migration gains 269 that are greater than their cross-cluster migration costs 271.

While cross-cluster migration recommendations 263 can be generated and implemented based on hardware efficiencies, the cross-cluster load balancer 139 can also perform cross-cluster live migrations in response to a number of other scenarios. For example, if the workload A3 has an affinity with workload B1, the cross-cluster load balancer 139 can identify this, and can migrate the workload A3 from cluster A to cluster B to enforce the affinity rule. This can be performed regardless of hardware resource efficiency. In further examples, workload B1 can maintain information in a database or data structure that is utilized by a number of other workloads including the workload B2 and the workload A3. The cross-cluster load balancer 139 can identify that the workload A3 includes an application that uses the database maintained by workload B1, and can migrate workload A3 to cluster B to improve application performance. The cross-cluster load balancer 139 can for example, the cross-cluster load balancer 139 can detect that the host A2, or the cluster A has been manually placed in a maintenance mode. The cross-cluster load balancer 139 can recommend and implement cross-cluster migrations of the workloads A1, A2, and A3 to maintain accessibility.

Figure 3:
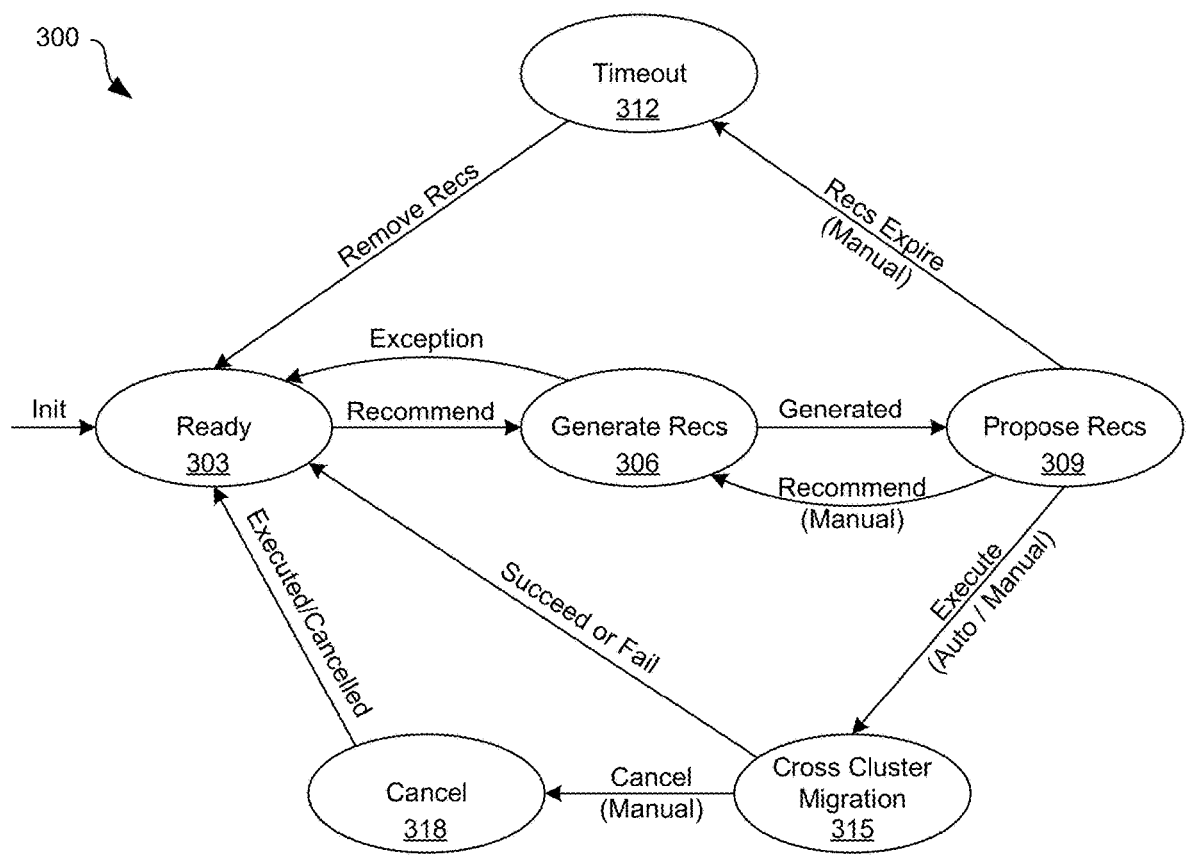
FIG. 3 is a flowchart illustrating an example of functionality implemented by the cross-cluster load balancer and other components of the networked environment of FIG. 1.

Turning now to FIG. 3, shown is a flowchart 300 illustrating an example of functionality implemented by a management service 135 with a cross-cluster load balancer 139, and other components of the networked environment 100 of FIG. 1. The steps of the flowchart 300 can depict an example of various executional states implemented by the cross-cluster load balancer 139, according to one or more examples. The separation or segmentation of functionality as discussed herein is presented for illustrative purposes only.

In step 303, the cross-cluster load balancer 139 can be in a ready state. In the ready state, the cross-cluster load balancer 139 can be initialized and ready for invocation. The management service 135 can initialize the cross-cluster load balancer 139 within the multi-cluster management environment 103.

In step 306, the cross-cluster load balancer 139 can generate cross-cluster migration recommendations 263 as discussed with respect to FIG. 2. This process is also discussed in further detail with respect to FIG. 4. The cross-cluster load balancer 139 can receive an API call that invokes the recommendation API. The cross-cluster load balancer 139 can analyze the clusters 106 to migrate workloads 145 from clusters 106 with higher resource utilization, and to clusters 106 with lower resource utilization.

The cross-cluster load balancer 139 can analyze the workloads 145 from a high-utilization cluster 106 in order to identify whether or not each of the workloads 145 can benefit from a cross-cluster migration. The cross-cluster load balancer 139 can determine a cross-cluster migration gain 269 for each workload 145 in the high-utilization cluster 106. The cross-cluster migration gain 269 can be determined using host-specific and/or cluster-level resource usage. If the cross-cluster migration gain 269 is greater than a cross-cluster migration cost 27, the cross-cluster load balancer 139 can accept the cross-cluster migration recommendation 263.

The cross-cluster migration recommendation 263 can identify a destination cluster 106, and can further specify a destination datastore 130, and a specific host 115 that are associated with a maximal cross-cluster migration gain 269. If an exception or error occurs, the process can move to step 303. Otherwise, if cross-cluster migration recommendations 263 are generated, then the process can move to step 309.

In step 309, the cross-cluster load balancer 139 can propose the cross-cluster migration recommendations 263 for authorization. The cross-cluster load balancer 139 can reserve resources in the destination cluster 106, for example, within the destination datastore 130 and host 115. In manual mode, the cross-cluster load balancer 139 can transmit or otherwise provide the cross-cluster migration recommendations 263 to a user for manual acceptance or rejection. The management service 135 can include a console user interface that presents the cross-cluster migration recommendations 263, identifying the workload 145, the source and destination clusters 106 and hosts 115, as well as the expected gain.

The cross-cluster migration recommendations 263 can be associated with a timeout period. If the cross-cluster migration recommendations 263 are unauthorized within the timeout period, the process can move to step 312. Otherwise, if the cross-cluster migration recommendations 263 are authorized, then the process can move to step 315. A user can alternatively request that the cross-cluster load balancer 139 reevaluate the clusters and generate new cross-cluster migration recommendations 263, and the process can move to step 306. In automated mode, the cross-cluster load balancer 139 can automatically authorize the cross-cluster migration recommendations 263 and move to step 315.

In step 315, the cross-cluster load balancer 139 can perform cross-cluster migrations. For example, the cross-cluster load balancer 139 can work with the cluster scheduling service 137 to prepare the workloads 145 for execution on the destination cluster 106, datastore 130, and host 115. The cross-cluster load balancer 139 can perform a number of cross-cluster migrations according to the authorized cross-cluster migration recommendations 263. If a cross-cluster migration fails or succeeds, the process can move to step 303. The cross-cluster migration can fail if it takes longer than a threshold migration time, if the destination host 115 or datastore 130 goes offline, or other exceptions occur. In the case of a failure, the cross-cluster load balancer 139 can clean up or delete partially-deployed workloads 145 from the destination cluster 106, and free the resources that were reserved for migration. In some cases, the cross-cluster load balancer 139 can provide a progress indicator in the console user interface of the management service 135. The console user interface can also provide a user interface element that, when selected, cancels the migration. If the migration is manually cancelled, the process can move to step 318.

In step 318, the cross-cluster load balancer 139 can cancel the cross cluster migration. The cancel API can be invoked to manually stop a cross-cluster migration that is being performed. The cancel API can also clean up or delete partially-deployed workloads 145 from the destination cluster 106, and free the resources that were reserved for migration. Thereafter, the process can move to step 303.

Figure 4:
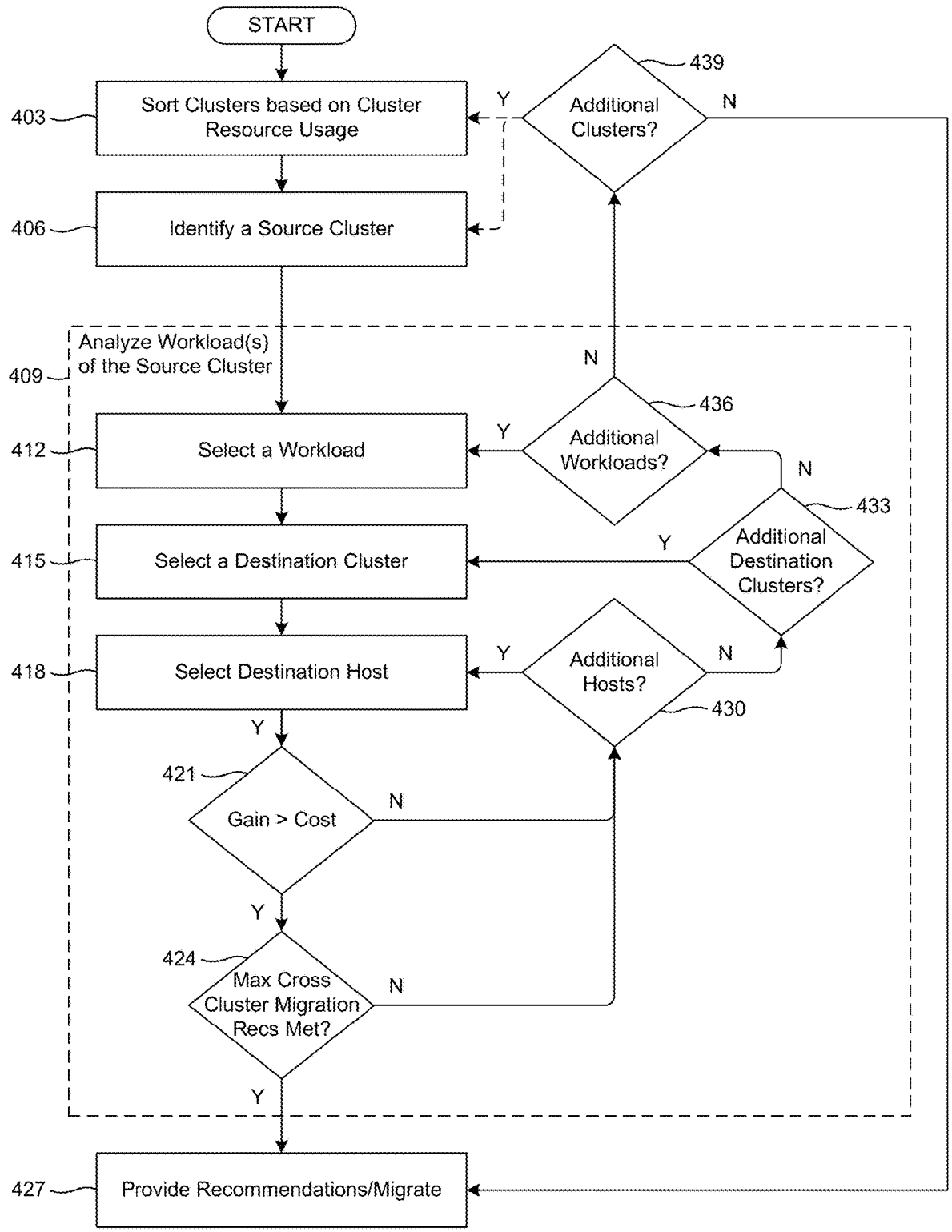
FIG. 4 is another flowchart illustrating an example of functionality implemented by the cross-cluster load balancer and other components of the networked environment of FIG. 1.

FIG. 4 shows a flowchart 400 that provides one example of functionality implemented by a management service 135 with a cross-cluster load balancer 139, and other components of the networked environment 100 of FIG. 1. The flowchart 400 can depict an example of how the cross-cluster load balancer 139 can analyze the clusters 106 to generate cross-cluster migration recommendations 263, according to one or more examples. The separation or segmentation of functionality as discussed herein is presented for illustrative purposes only.

In step 403, the cross-cluster load balancer 139 can sort clusters 106 based on cluster resource usage 261. For example, the cross-cluster load balancer 139 can receive a request to generate cross-cluster migration recommendations 263. Such a request can include invoking the recommendation API with input parameters including a set of participant clusters 106 to analyze for cross-cluster load balancing. The participant set of clusters 106 can include all clusters 106 of an enterprise datacenter, or a manually-selected subset of the clusters 106. The request can also indicate a mode selection of manual mode or automated mode.

The cross-cluster load balancer 139 can analyze the set of participant clusters 106 to determine a cluster resource usage 261 for each cluster 106. The cluster resource usage 261 can include a cluster resource usage score that considers one or more of the compute, memory, storage, network, accelerate, and other hardware resource information for each cluster. The cluster resource usage 261 can refer to a dominant resource usage for each cluster 106, an average resource contention for one or more of the hardware resources, or another measure. The cross-cluster load balancer 139 can generate a ranked list of the participant clusters 106 in descending order of their cluster resource usage 261.

In step 406, the cross-cluster load balancer 139 can identify or select a source cluster 106. The source cluster 106 can be the cluster 106 that has the highest cluster resource usage 261 of the participant clusters 106. For example, the source cluster 106 can be ranked highest in the ranked list of the participant clusters 106.

In step 409, the cross-cluster load balancer 139 can analyze the workloads 145 of the source cluster 106. Generally, the cross-cluster load balancer 139 can go through each of the workloads 145 of the source cluster 106 to determine whether to perform a cross-cluster migration of that workload 145 from the high-usage source cluster 106 to a lower-usage destination cluster 106.

In step 412, the cross-cluster load balancer 139 can select a workload 145 to analyze for cross-cluster migration. The cross-cluster load balancer 139 can select the workload 145 at random or based on its hardware resource requirements, execution time, and other factors.

In step 415, the cross-cluster load balancer 139 can select a destination cluster 106. The destination cluster 106 can be a cluster from a subset of the participant clusters 106 with the source cluster 106 removed. In some cases, the cross-cluster load balancer 139 can select the destination cluster 106 based on its cluster resource usage 261. For example, the destination cluster 106 can be the lowest-ranked cluster in the ranked list of the participant clusters 106. The cross-cluster load balancer 139 can select a destination cluster 106 that has a lower cluster resource usage 261 than the source cluster 106. Since a datastore 130 aggregates the storage resources of a cluster 106, the destination cluster selection can refer to a selection of the destination datastore 130.

In step 418, the cross-cluster load balancer 139 can select a destination host 115. In some cases, the cross-cluster load balancer 139 can select the destination cluster 106 based on its cluster resource usage 261. Otherwise, the cross-cluster load balancer 139 can try various hosts 115 in succession to determine an optimal destination host 115 for the migration. In some cases, the cross-cluster load balancer 139 can communicate the resource requirements of the workload 145 to the cluster scheduling service 137, and the cluster scheduling service 137 can identify the destination host 115.

In step 421, the cross-cluster load balancer 139 can determine whether a cross-cluster migration gain 269 is greater than a cross-cluster migration cost 271. The cross-cluster migration gain 269 can refer to the resource benefit of moving a workload 145 from its source cluster 106 to a destination cluster 106. The cross-cluster migration gain 269 can be determined based on host-specific or cluster-level measures, among the various embodiments. The cross-cluster load balancer 139 can determine the cross-cluster migration gain 269 as the mathematical product of a gain rate and a gain duration. The cross-cluster load balancer 139 can compare the cross-cluster migration gain 269, to a cross-cluster migration cost 271, as described in equation 4. If the cross-cluster migration gain 269 is greater than the cross-cluster migration cost 271, then the cross-cluster load balancer 139 can generate a cross-cluster migration recommendation 263 that specifies the destination cluster 106, as well as the destination datastore 130 and destination host 115.

The cross-cluster load balancer 139 can perform an iterative process to determine the best destination cluster 106, including the destination datastore 130 and destination host 115. For example, if the cross-cluster migration gain 269 is greater than the cross-cluster migration cost 271, the cross-cluster load balancer 139 can compare the current cross-cluster migration gain 269 to a previous best cross-cluster migration gain 269 based on another destination datastore 130 and destination host 115.

In step 424, the cross-cluster load balancer 139 can determine if a maximum number of cross-cluster migration recommendations 263 is met. The number of migrations can be limited to a predetermined number of recommendations. If the total number of cross-cluster migration recommendations 263 is equal to the maximum number, then the process can move to step 427. Otherwise, if the total number of cross-cluster migration recommendations 263 is less than the predetermined maximum, then the process can move step 430.

In step 427, the cross-cluster load balancer 139 can provide the cross-cluster migration recommendations 263 or automatically migrate workloads 145 according to the cross-cluster migration recommendations 263. In automated mode, the cross-cluster load balancer 139 can automatically migrate workloads 145 according to the cross-cluster migration recommendations 263. In manual mode, the cross-cluster load balancer 139 can transmit or otherwise provide the cross-cluster migration recommendations 263 to the management service 135. The management service 135 can generate a user interface that includes the cross-cluster migration recommendations 263. The user interface can also include a description or identification of the workload 145, as well as resource usage information for the source cluster 106 and the destination cluster 106. The resource usage information can include current cluster resource usage 261 and projected cluster resource usage if the migration is carried out.

In step 430, the cross-cluster load balancer 139 can determine whether there are additional hosts 115 that have not been analyzed as destination candidates for the workload 145. If there are additional hosts 115, then the cross-cluster load balancer 139 can move to step 418 and select another candidate destination host. The cross-cluster load balancer 139 can iteratively determine cross-cluster migration gains 269 for each host 115 of the current candidate destination cluster 106, and can identify the host 115 that is associated with the highest cross-cluster migration gain 269. If there are no additional hosts 115, then the cross-cluster load balancer 139 can move to step 433.

In step 433, the cross-cluster load balancer 139 can determine whether there are additional destination clusters 106 that have not been analyzed as destination candidates for the workload 145. If there are additional destination clusters 106, then the cross-cluster load balancer 139 can move to step 415 and select another candidate destination cluster 106. As a result, the cross-cluster load balancer 139 can iteratively select each destination cluster 106 to determine the optimal destination for the workload 145. If there are no additional destination clusters 106, then the cross-cluster load balancer 139 can move to step 436.

In step 436, the cross-cluster load balancer 139 can determine whether the source cluster 106 includes additional workloads 145 that have not been analyzed for cross-cluster migration. If there are additional workloads 145, then the cross-cluster load balancer 139 can move to step 412 and select another workload 145 from the source cluster 106. As a result, the cross-cluster load balancer 139 can iteratively determine whether each workload 145 can benefit from cross-cluster migration. If there are no additional workloads 145, then the cross-cluster load balancer 139 can move to step 439.

In step 439, the cross-cluster load balancer 139 can determine whether there are any additional source clusters 106 that have not been analyzed for cross-cluster migration. If there are additional source clusters 106, then the cross-cluster load balancer 139 can move to step 403 or 406. As a result, the cross-cluster load balancer 139 can iteratively analyze the set of participant clusters 106 to determine whether their workloads 145 can benefit from cross-cluster migration. If there are no source clusters 106, then the cross-cluster load balancer 139 can move to step 427.

Stored in the memory device are both data and several components that are executable by the processor. Also stored in the memory can be a datastore 130 and other data. A number of software components are stored in the memory and executable by a processor. In this respect, the term "executable" means a program file that is in a form that can be ultimately be run by the processor. Examples of executable programs can be, for example, a compiled program that can be translated into machine code in a format that can be loaded into a random access portion of one or more of the memory devices and run by the processor, code that can be expressed in a format such as object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Memory can include both volatile and nonvolatile memory and data storage components. In addition, a processor can represent multiple processors and/or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In such a case, a local interface can be an appropriate network that facilitates communication between any two of the multiple processors or between any processor and any of the memory devices. The local interface can include additional systems designed to coordinate this communication, including, for example, performing load balancing. The processor can be of electrical or of some other available construction.

Client devices 108 can be used to access user interfaces generated to configure or otherwise interact with the cluster management service 135. These client devices 108 can include a display upon which a user interface generated by a client application for providing a virtual desktop session (or other session) can be rendered. In some examples, the user interface can be generated using user interface data provided by the management environment 103. The client device 108 can also include one or more input/output devices that can include, for example, a capacitive touchscreen or other type of touch input device, fingerprint reader, or keyboard.

Although the cluster management service 135 and other various systems described herein can be embodied in software or code executed by general-purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include discrete logic circuits having logic gates for implementing various logic functions upon an application of one or more data signals, application specific integrated circuits (ASICs) having appropriate logic gates, field-programmable gate arrays (FPGAs), or other components.

The sequence diagram and flowcharts show an example of the functionality and operation of an implementation of portions of components described herein. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the sequence diagram flowcharts show a specific order of execution, it is understood that the order of execution can differ from that which is depicted. For example, the order of execution of two or more blocks can be scrambled relative to the order shown. In addition, two or more blocks shown in succession can be executed concurrently or with partial concurrence. Further, in some examples, one or more of the blocks shown in the drawings can be skipped or omitted.

Also, any logic or application described herein that includes software or code can be embodied in any non-transitory computer-readable medium for use by or in connection with an instruction execution system such as, for example, a processor in a computer system or other system. In this sense, the logic can include, for example, statements including program code, instructions, and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can include any one of many physical media, such as magnetic, optical, or semiconductor media. More specific examples of a suitable computer-readable medium include solid-state drives or flash memory. Further, any logic or application described herein can be implemented and structured in a variety of ways. For example, one or more applications can be implemented as modules or components of a single application. Further, one or more applications described herein can be executed in shared or separate computing devices or a combination thereof. For example, a plurality of the applications described herein can execute in the same computing device, or in multiple computing devices.

It is emphasized that the above-described examples of the present disclosure are merely possible examples of implementations set forth for a clear understanding of the principles of the disclosure. Many variations and modifications can be made to the above-described embodiments without departing substantially from the spirit and principles of the disclosure. While aspects of the disclosure can be described with respect to a specific figure, it is understood that the aspects are applicable and combinable with aspects described with respect to other figures. All such modifications and variations are intended to be included herein within the scope of this disclosure.

Therefore, the following is claimed:

1. A non-transitory computer-readable medium comprising program instructions that when executed cause at least one computing device to at least:
   identify a set of clusters to analyze for cross-cluster workload migration;
   generate a ranked list of the set of clusters;
   identify a source cluster for cross-cluster migration based on the ranked list;
   determine a cross-cluster migration gain to migrate a workload from the source cluster to a destination cluster, wherein the cross-cluster migration gain is determined based at least in part on a gain rate and a gain duration, the gain rate being based at least in part on a destination resource efficiency of the workload on the destination cluster, wherein the gain duration is an estimated duration of the gain rate at the destination cluster and is based at least in part on a cross-cluster migration time and a frequency of cross-cluster workload migrations to and from the destination cluster;
   generate a cross-cluster migration recommendation to migrate the workload from the source cluster to the destination cluster based at least in part on the cross-cluster migration gain;
   determine that a maximum quantity of cross-cluster migration recommendations has been met based on a comparison between a total quantity of cross-cluster migration recommendations and the maximum quantity of cross-cluster migration recommendations, the cross-cluster migration recommendation being included to the total quantity of cross-cluster migration recommendations; and
   execute a migration of the workload from the source cluster to the destination cluster based at least in part on the maximum quantity of cross-cluster migration recommendations being met.

2. The non-transitory computer-readable medium of claim 1, wherein a respective cluster of the set of clusters comprises a storage area network that aggregates storage available to physical resources of the respective cluster.

3. The non-transitory computer-readable medium of claim 1, wherein the workload is identified based on a hardware resource requirement or an execution time.

4. The non-transitory computer-readable medium of claim 1, wherein the program instructions that when executed further cause the at least one computing device to at least: specify an optimal host in the destination cluster for the migration of the workload.

5. The non-transitory computer-readable medium of claim 1, wherein the destination cluster is selected based on the destination cluster having a lower cluster resource usage than the source cluster.

6. A system, comprising:
at least one computing device; and
program instructions stored in a datastore and executable in the at least one computing device that, when executed by the at least one computing device, cause the at least one computing device to at least:
generate a ranked list of a set of clusters for cross-cluster workload migration;
identify a source cluster for cross-cluster migration based on the ranked list;
determine a cross-cluster migration gain to migrate a workload from the source cluster to a destination cluster, wherein the cross-cluster migration gain is determined based at least in part on a gain rate and a gain duration, the gain rate being based at least in part on a destination resource efficiency of the workload on the destination cluster, wherein the gain duration is an estimated duration of the gain rate at the destination cluster and is based at least in part on a cross-cluster migration time and a frequency of cross-cluster workload migrations to and from the destination cluster;
generate a cross-cluster migration recommendation to migrate the workload from the source cluster to the destination cluster based at least in part on the cross-cluster migration gain;
determine that a maximum quantity of cross-cluster migration recommendations has been met based on a comparison between a total quantity of cross-cluster migration recommendations and the maximum quantity of cross-cluster migration recommendations, the cross-cluster migration recommendation being included to the total quantity of cross-cluster migration recommendations; and
execute a migration of the workload from the source cluster to the destination cluster based at least in part on the maximum quantity of cross-cluster migration recommendations being met.

7. The system of claim 6, wherein a respective cluster of the set of clusters comprises a storage area network that aggregates storage available to physical resources of the respective cluster.

8. The system of claim 6, wherein the workload is identified based on a hardware resource requirement or an execution time.

9. The system of claim 6, wherein the program instructions that when executed further cause the at least one computing device to at least: specify an optimal host in the destination cluster for the migration of the workload.

10. The system of claim 6, wherein the destination cluster is selected based on the destination cluster having a lower cluster resource usage than the source cluster.

11. The system of claim 6, wherein the program instructions, when executed by the at least one computing device, cause the at least one computing device to at least:
determine that the migration of the workload fails based on at least one of a threshold migration time period being met, the destination cluster goes offline, or a cluster datastore goes offline.

12. The system of claim 11, wherein the program instructions, when executed by the at least one computing device, cause the at least one computing device to at least:
delete a partially-deployed workload associated with the migration of the workload from the destination cluster based on the determination of the failure of the migration of the workload.

13. The system of claim 6, wherein the ranked list of the set of clusters is generated based at least in part on a cluster resource usage of a respective cluster of the set of clusters.

14. A computer-implemented method, comprising:
generating a ranked list of a set of clusters for cross-cluster workload migration;
identifying a source cluster for cross-cluster migration based on the ranked list;
determining a cross-cluster migration gain to migrate a workload from the source cluster to a destination cluster, wherein the cross-cluster migration gain is determined based at least in part on a gain rate and a gain duration, the gain rate being based at least in part on a destination resource efficiency of the workload on the destination cluster, wherein the gain duration is an estimated duration of the gain rate at the destination cluster and is based at least in part on a cross-cluster migration time and a frequency of cross-cluster workload migrations to and from the destination cluster from the source cluster;
generating a cross-cluster migration recommendation to migrate the workload from the source cluster to the destination cluster based at least in part on the cross-cluster migration gain;
determining that a maximum quantity of cross-cluster migration recommendations has been met based on a comparison between a total quantity of cross-cluster migration recommendations and the maximum quantity of cross-cluster migration recommendations, the cross-cluster migration recommendation being included to the total quantity of cross-cluster migration recommendations; and
executing a migration of the workload from the source cluster to the destination cluster based at least in part on the maximum quantity of cross-cluster migration recommendations being met.

15. The computer-implemented method of claim 14, wherein a respective cluster of the set of clusters comprises a storage area network that aggregates storage available to physical resources of the respective cluster.

16. The computer-implemented method of claim 14, wherein the workload is identified based on a hardware resource requirement or an execution time.

17. The computer-implemented method of claim 14, wherein for the migration of the workload, specifying an optimal host in the destination cluster.

18. The computer-implemented method of claim 14, wherein the destination cluster is selected based on the destination cluster having a lower cluster resource usage than the source cluster.

19. The computer-implemented method of claim 15, further comprising: determining that the migration of the workload fails based on at least one of a threshold migration time period being met, the destination cluster goes offline, or a cluster datastore goes offline.

20. The computer-implemented method of claim 19, further comprising:
- deleting a partially-deployed workload associated with the migration of the workload from the destination cluster based on the determination of the failure of the migration of the workload.

* * * * *